March 2, 1954  W. F. EGLOFF ET AL  2,670,847
PURIFICATION OF FLUIDS BY MEANS IN A SETTLING
TANK OF MAGNETIC SEPARATION
Filed March 3, 1951  4 Sheets-Sheet 1
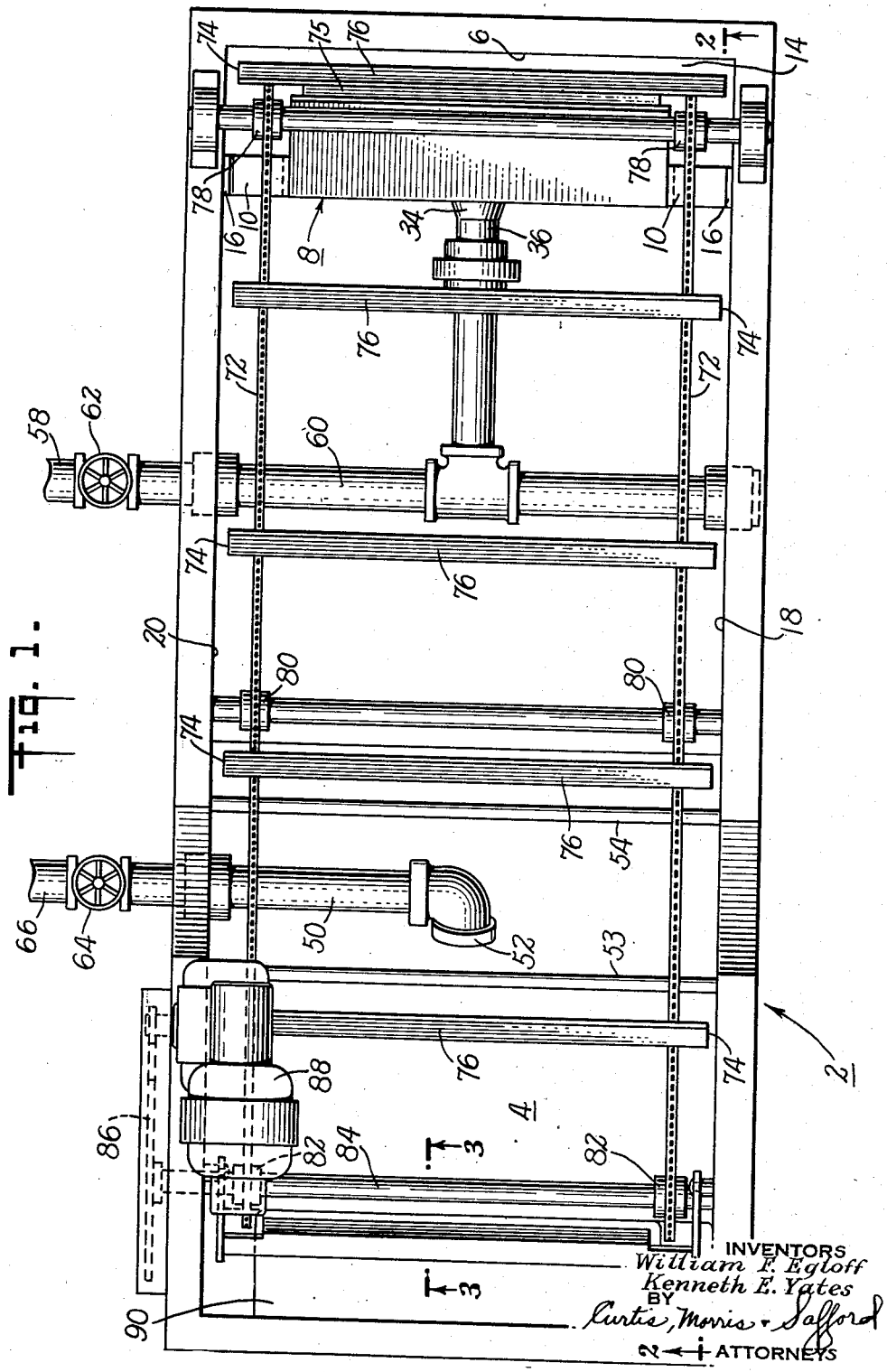
INVENTORS
William F. Egloff
Kenneth E. Yates
BY
Curtis, Morris & Safford
ATTORNEYS

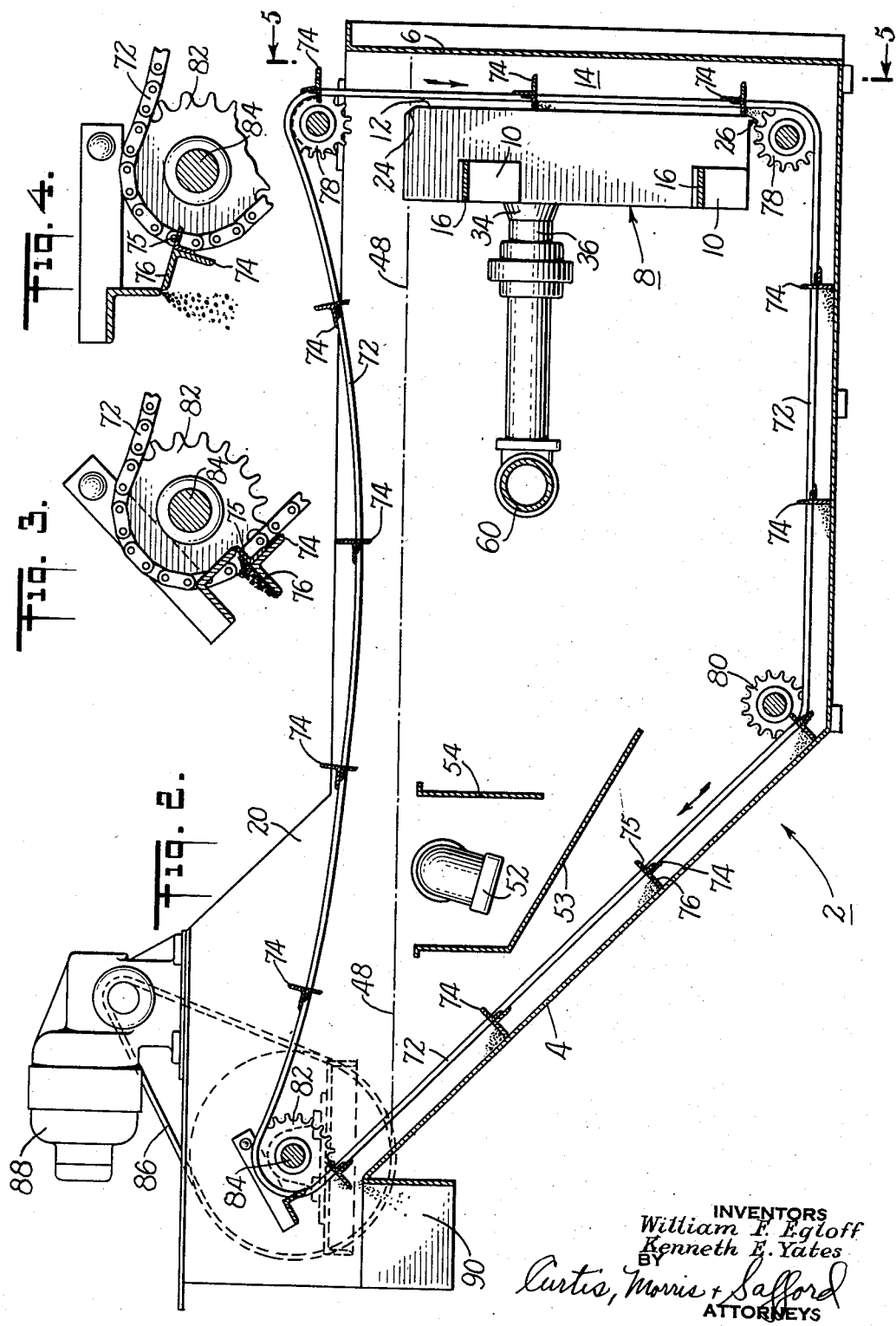

Figures 5, 6:
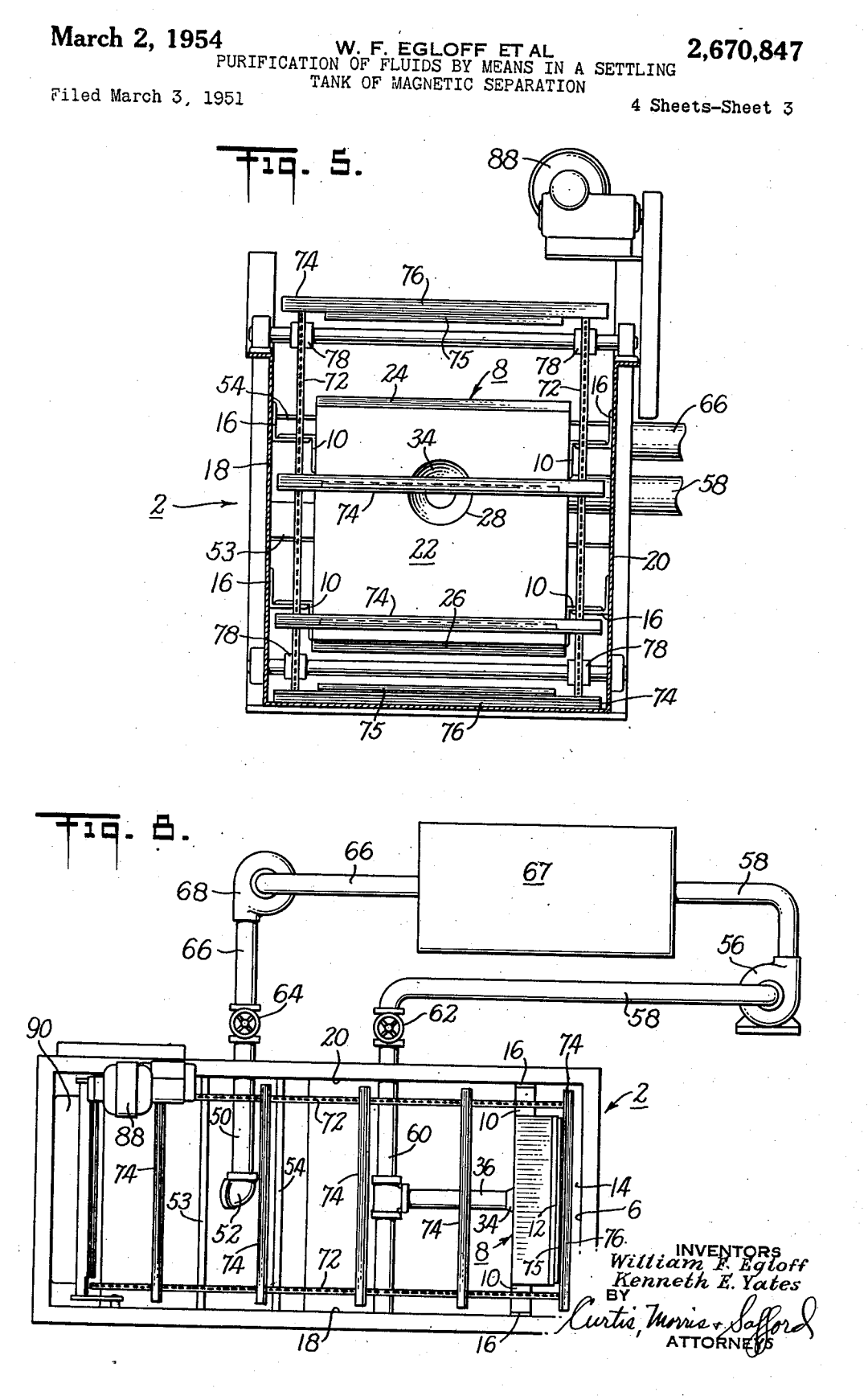

March 2, 1954     W. F. EGLOFF ET AL     2,670,847
PURIFICATION OF FLUIDS BY MEANS IN A SETTLING
TANK OF MAGNETIC SEPARATION
Filed March 3, 1951     4 Sheets-Sheet 3

INVENTORS
William F. Egloff
Kenneth E. Yates
BY
Curtis, Morris & Safford
ATTORNEYS

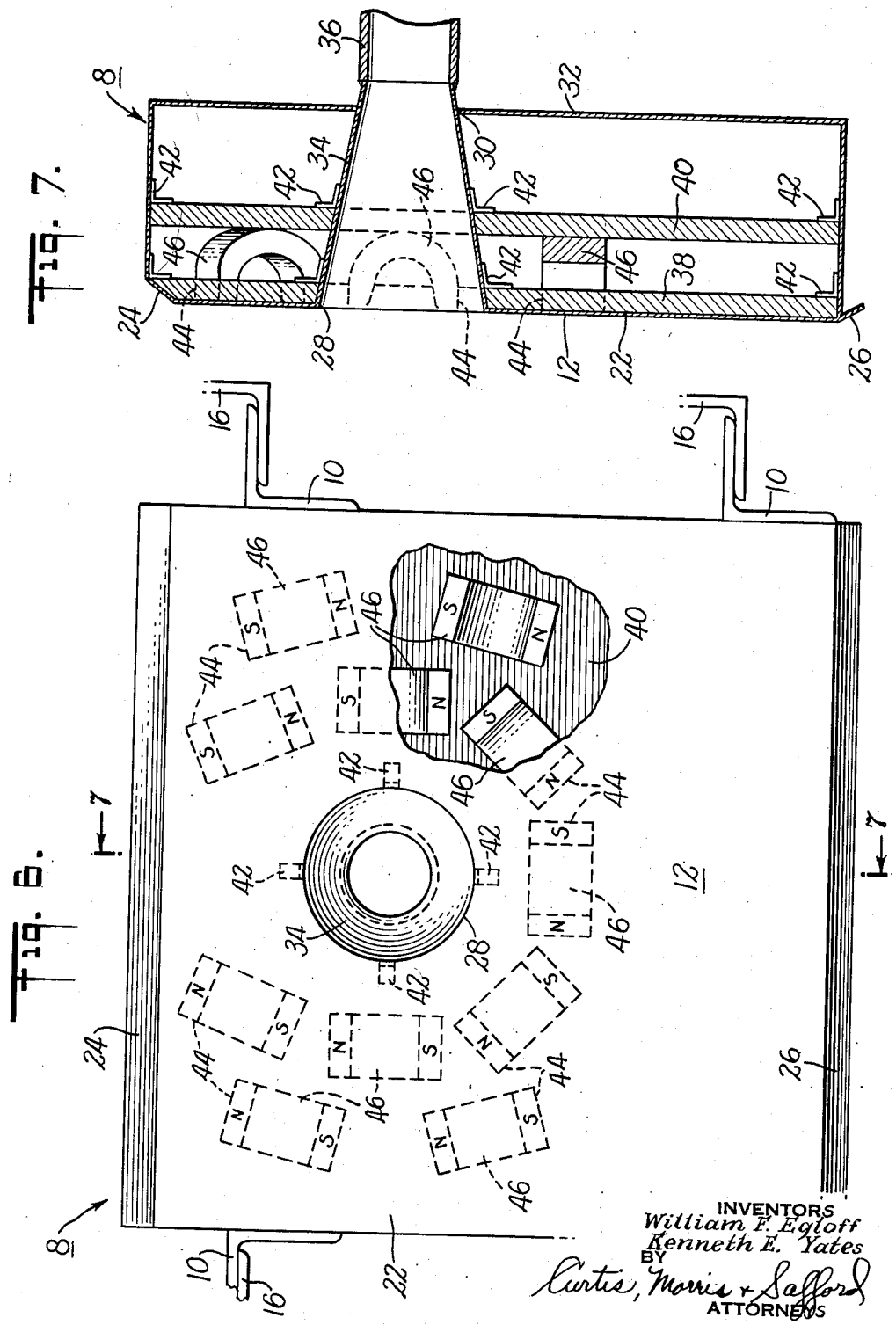

Patented Mar. 2, 1954

2,670,847

UNITED STATES PATENT OFFICE 2,670,847

PURIFICATION OF FLUIDS BY MEANS IN A SETTLING TANK OF MAGNETIC SEPARATION

William F. Egloff and Kenneth E. Yates, Syracuse, N. Y., assignors to United States Hoffman Machinery Corporation, New York, N. Y., a corporation of Delaware Application March 3, 1951, Serial No. 213,707

1 Claim. (Cl. 210—1.5)

This invention relates to the purification of fluids and more particularly to the removal of metal chips and abrasive particles from coolant used in abrading operations. Such removal has heretofore been accomplished by passing the used coolant through settling tanks and filtering apparatus before returning it to the cutting or abrading tool for reuse. Magnetic separators have also been used for the same purpose.

While good results as regards purification have been attained in the use of the former type of apparatus, so long as the filters were maintained in good working condition, a practical disadvantage lies in the fact that the filter surfaces soon become clogged and removal of the filter cake collected thereon becomes necessary at somewhat frequent intervals, by alternating a filtering cycle with a backwashing cycle, during the latter cycle the filter cake is removed and deposited as sludge in the bottom of the settling tank. On the other hand, such magnetic separators as have been used for the removal of metal and abrasive particles from soiled coolant have relied almost entirely upon their magnetic action and have not incorporated the separator devices in apparatus wherein proper provision was made for the settling out of the coolant of the coarser particles of metal and abrasive material. As an example of the tank settling and filtering procedure and construction reference may be had to the coolant filter system disclosed in United States Patent 2,494,534. The general operation of a magnetic separator for coolants may be found in United States Patent 2,466,839.

One of the objects of the present invention is to provide apparatus adapted to attain more efficient coolant treatment in a simple and practical system embodying settling arrangements whereby coarser abrasive material and magnetic metallic particles are effectively removed and which system additionally includes an improved magnetic unit, especially arranged and adapted to the elimination of such fine metallic particles as have a tendency to remain in suspension in the fluid and consequently are not removed by settling alone. A further object is to provide means to control the rate of flow of the coolant through the settling tank to the area where magnetic attraction of the unit becomes operable upon the suspended magnetic content of the coolant. A further object is to provide an improved form of magnetic unit for cooperative use within a settling tank and to further provide for the practical location of such unit within said tank. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claim.

In the drawings—

Fig. 1 is a plan view of one embodiment of the invention; comprising a separator tank and magnetic unit;

Fig. 2 is a vertical section taken substantially on line 2—2 of Fig. 1;

Fig. 3 is a slightly enlarged fragmentary cross section of the flight wiper assembly taken on line 3—3 of Fig. 1;

Fig. 4 is a view similar to Fig. 3 showing the final point of scraping or wiping action in respect to a conveyor flight member;

Fig. 5 is a left end view of the invention as shown in Fig. 1; the left end wall of the tank being omitted and portions of the side and bottom walls being shown in cross-section;

Fig. 6 is an enlarged front elevation of the magnetic separator unit embodied in the apparatus as shown in Figs. 1 and 2 with a section of the front plate cut away;

Fig. 7 is a vertical cross section taken on line 7—7 of Fig. 6;

Fig. 8 is a diagrammatic view of a closed coolant purification system.

As conducive to a clearer understanding of the invention it should be understood that with cutting and grinding tools it is common practice to supply a coolant in the form of a stream of liquid, such as an oil emulsion, which flows onto the tool and the work during the working operation. This coolant carries away from the work small particles of metal and, during a grinding operation, small particles of the grinding wheel (referred to as emery). As will be readily seen, it is important to remove such particles of emery and metal from the coolant in order to avoid scratching the finished surfaces of the parts treated in the machine tool.

In the illustrated embodiment of the invention the supply of coolant is held in a horizontal tank having disposed adjacent one end a magnetic separator unit assembly, about and through which the coolant flows in its passage from the inflow to the outflow pipes of the tank, which conduct the coolant from and to an associated machine tool. At the end of the tank opposite the separator unit, the end wall of the tank is inclined, and a slow-moving endless chain conveyor, comprising a drag arrangement, continuously clears the front surface of the magnetic unit of collected particles of metal and also continuously removes sludge, containing both metallic and emery particles, from the bottom of the tank, to discharge the sludge over the top of the inclined wall into any suitable receptacle.

A pump means causes the coolant to flow from the tank after its passage through the magnetic unit to the machine tool, from which it is returned by means of the inflow or return conduit to the tank for purification. Valves, placed in the inflow and outflow lines, control the rate of flow of the coolant through the system, whereby the period of time required for the influent coolant to pass to the operative area of the magnet unit may be nicely determined. The period of detention in the tank will vary with the size and capacity of the system and with the viscosity of the coolant employed. In practice these detention periods vary between three and five minutes.

The magnetic plate comprises the front face of a fluid tight non-corrodible box, in which are incorporated a group or groups of permanent magnets, as will be described later.

Referring to Figs. 1 and 2 of the drawings, an open-topped horizontal rectangular tank 2 has at the left or rear end (Fig. 2), an inclined end wall 4 and, at the right an upright end wall 6. The box-like magnetic separator unit 8 is supported upon the side walls of the tank by angle brackets 10, in such spaced relation to the wall 6 as to leave between the wall 6 and the front face 12 of the unit a field of magnetic attraction 14. The brackets 10 rest upon suitable angle members 16 preferably welded upon the side walls 18 and 20 of the tank (Figs. 1, 2 and 5).

The magnetic separator unit 8 comprises a rectangular box-like structure, upon two sides of which the brackets 10 are mounted. The front face of the box unit is a magnetic plate 22, which is hermetically sealed in contact with the front edges of the box structure. At top and bottom of the front face, rearwardly inclined surfaces are provided, as at 24 and 26 (Fig. 7) to facilitate the passage thereover of the wiper flights of the sludge conveyor hereinbefore mentioned. Somewhat above the center of the magnetic plate 22 and centrally disposed with respect to the sides of the unit, the plate is provided with a circular opening 28 (see Figs. 6 and 7) of relatively large size, as for example 4 inches. Directly opposite this opening a smaller opening 30 is provided in the rear wall 32 of the unit. Mounted in sealed relation to these openings is a funnel-shaped reducing member 34 which extends rearwardly of the opening 30, where it is connected to a pipe nipple 36. The reducer 34 is supported within the box-like unit structure by two suitable partitions 38 and 40 composed preferably of plywood, which fit tightly about the member 34 and are in close contact at their edges with the interiors of the side walls of the unit. Suitable brackets or clips 42 are employed to mount the plywood partitions and the reducer member in substantially rigid relation to the said unit walls.

A plurality of openings as 44 are formed in the partition 38 in a selected geometrical arrangement about the exit passage formed by the funnel 34 and in each of these openings is set the north and south poles of a horseshoe shaped permanent magnet 46 of high permeability. The several magnets are so arranged as to bring poles of opposite polarity of adjacent magnets in suitable nearness to each other, whereby poles of the same polarity are disposed remotely from one another. These magnets serve to set up magnetic fields in the magnetizable sheet or plate 22 which fields extend their attraction through a considerable portion of the space in front of said plate, whereby a high percentage of the magnetic particles entrained in the coolant are attracted to the face of the magnetic plate as the coolant flows around the sides of the unit to the front side of the discharge conduit 34. The said magnets are firmly held in their chosen positions by the plywood forms and such forms are held in their positions by clips 42. The coolant fluid level is constantly maintained approximately one inch below the top of the separator unit, as indicated at 48 in Fig. 2.

The dirty coolant enters the tank 2 in the zone over the inclined end wall 4 through a pipe 50 having a rearwardly and downwardly turned outlet 52. Suitable baffle walls 53 and 54 direct the coolant toward the front or right end of the tank as seen in the figures. Baffles 53 and 54 extend between the tank side walls 18 and 20 to which the baffles are welded. The incoming coolant is thus directed by the baffles toward the separator unit about which it passes on its way to the mouth 28 of the discharge conduit 34. During the slow movement of the unagitated coolant to the discharge the heavier particles of both emery and metal settle to the bottom of the tank, while nearly all finer particles of metal still suspended in the emulsion are drawn to and collect upon the magnetic plate.

The flow of coolant through and out of the tank and unit is largely due to the operation of a centrifugal or other pump 56 which connects on its suction side by means of a pipe 58 and a pipe 60 supported within the tank with the separator discharge nipple 36. The pipe 60 extends across the tank from side to side and may be connected to the discharge pump at either end, the unused end being capped or closed with a suitable plug.

A valve 62 is connected in the discharge line 58—60 and a valve 64 in the coolant admission line 50. The discharge side of the pump is, as indicated in Fig. 8, connected to deliver clean coolant to a machine to a machine tool 67, the return line 66 from which connects through any suitable delivery pump 68 and control valve 64, with the inflow pipe 50 of the separator tank.

The metal particles which have been collected upon the magnetic plate of the separator unit and the sludge colleted on the sloping side and bottom of the tank are removed by an endless chain conveyor or wiper assembly formed by two endless chains 72 and a number of spaced scrapers or flights 74, each of which comprise a plate wiper 75 and a tank bottom wiper 76. These wipers are made in the form of a pair of large and small angle irons welded back to back and secured as by welding near the end of each pair to a link of the two conveyor chains 72. Each chain extends (Fig. 2) around upper and lower idler sprocket wheels 78 at the right end of the tank, along the bottom of the tank to another idler sprocket wheel 80, disposed adjacent the angle formed by the meeting of the bottom of the tank with the inclined end; up the slanting end wall of the tank to a drive sprocket wheel 82 and then to the right to the upper sprocket wheel 78. Each pair of sprocket wheels is mounted on a shaft (see Fig. 1) which is supported at the two sides of the tank. Sprocket wheels 82 have a shaft 84 which is driven at one end through a belt 86 by a motor 88. In operation, the flights 75 are moved slowly downwardly in wiping contact with the outer surface of magnetic plate 12. The metallic sludge removed thereby is deposited in the path of the wiper members 76 which move slowly along the bottom of the tank and up the wall 4. At the top of the end wall 4 the sludge collected or carried by each flight is scraped downwardly off the same, as indicated in Figs. 3 and 4, to be discharged beyond the top of the end wall into a suitable sludge chute 90, beneath which any portable catch receptacle may be placed.

One of the advantages attending the use of the disclosed magnetic separator unit in a sludge settling tank, in place of the ordinary pressure filter, is that practically no service maintenance is required, as previously experienced by the users of filters with regard to screen cleaning and the changing of filter papers, bags or cartridges. Further, it will be seen that the use of the magnetic separator unit in connection with a pressure filter should also increase the efficiency of the filter, as by installing the magnetic unit ahead of pressure filters and removing the bulk of the solids prior to filtration.

Tests made under varying conditions employing the separator assembly described have resulted in a percentage removal of solids from the coolant of from 75 to 90 per cent.

As many possible embodiments may be made of the mechanical features of the above invention without departing from the scope of the invention, it is to be understood that all matter hereinbefore set forth or shown in the accompanying drawings, is to be interpreted as illustrative and not in a limiting sense.

We claim:

In apparatus for removing entrained magnetic particles from a liquid of the nature described, in combination, an elongated horizontal tank adapted to contain a supply of said liquid and having at one end an upright wall, a box-like separator unit supported in spaced relation to said upright wall below the normal liquid level in said tank and comprising a magnetic plate facing said upright wall, inlet means disposed to deliver used liquid to said tank at a point remote from said magnetic unit, discharge means passing horizontally through said magnetic unit including said magnetic plate, adapted to permit removal of liquid from the space between said upright wall and said plate, means adapted to withdraw liquid from the said space through said conduit and maintain a flow of liquid within said tank from said inlet to said discharge means at a known rate, and means operable constantly to remove adhering magnetic particles from said magnetic plate.

WILLIAM F. EGLOFF.
KENNETH E. YATES.

References Cited in the file of this patent

UNITED STATES PATENTS

| Number | Name | Date |
| --- | --- | --- |
| Re. 16,932 | Rasey | Apr. 10, 1928 |
| 242,013 | Martin | May 24, 1881 |
| 1,209,654 | Anderson | Dec. 26, 1916 |
| 1,317,557 | Davis | Sept. 30, 1919 |
| 1,778,910 | Niven | Oct. 21, 1930 |
| 2,459,343 | Scrivener | Jan. 18, 1949 |
| 2,494,534 | Armstrong et al. | Jan. 17, 1950 |